United States Patent
Takasumi

(10) Patent No.: US 10,796,461 B2
(45) Date of Patent: Oct. 6, 2020

(54) IMAGE COLOR CONVERSION APPARATUS, NON-TRANSITORY COMPUTER-READABLE MEDIUM STORING COMPUTER PROGRAM, AND IMAGE COLOR CONVERSION METHOD

(71) Applicant: Olympus Corporation, Hachioji-shi, Tokyo (JP)

(72) Inventor: Shinya Takasumi, Akiruno (JP)

(73) Assignee: Olympus Corporation, Tokyo (JP)

(*) Notice: Subject to any disclaimer, the term of this patent is extended or adjusted under 35 U.S.C. 154(b) by 122 days.

(21) Appl. No.: 16/177,389

(22) Filed: Oct. 31, 2018

(65) Prior Publication Data

US 2019/0188883 A1 Jun. 20, 2019

(30) Foreign Application Priority Data

Dec. 19, 2017 (JP) .................. 2017-242986

(51) Int. Cl.
| | |
|---|---|
| G06T 11/00 | (2006.01) |
| H04N 9/64 | (2006.01) |
| H04N 9/69 | (2006.01) |
| H04N 9/67 | (2006.01) |
| H04N 1/60 | (2006.01) |

(52) U.S. Cl.
CPC .......... *G06T 11/001* (2013.01); *H04N 1/603* (2013.01); *H04N 9/643* (2013.01); *H04N 9/67* (2013.01); *H04N 9/69* (2013.01)

(58) Field of Classification Search
CPC ........ G06T 11/001; H04N 9/67; H04N 1/603; H04N 9/643; H04N 9/69; H04N 1/41; H04N 1/6008; H04N 1/6019

USPC ......................................................... 382/167
See application file for complete search history.

(56) References Cited

U.S. PATENT DOCUMENTS

| | | | | |
|---|---|---|---|---|
| 4,999,702 A | * | 3/1991 | Knierim ................... | H04N 9/69 348/675 |
| 2007/0097267 A1 | * | 5/2007 | Sakurai ................ | H04N 5/3572 348/571 |
| 2010/0208304 A1 | * | 8/2010 | Murase ..................... | G06T 7/90 358/3.26 |
| 2012/0050618 A1 | * | 3/2012 | Ikeda ........................ | H04N 9/77 348/674 |
| 2018/0124288 A1 | * | 5/2018 | Iwafuchi ............... | H04N 1/6025 |

(Continued)

FOREIGN PATENT DOCUMENTS

| | | | | |
|---|---|---|---|---|
| JP | 2006-121530 | | 5/2006 | |
| JP | 2019110467 | * | 7/2019 | ............... H04N 1/46 |

*Primary Examiner* — Jerome Grant, II
(74) *Attorney, Agent, or Firm* — John C. Pokotylo; Pokotylo Patent Services

(57) ABSTRACT

At least one processor configured as hardware generates gamma correction processing information based on an achromatic color input value and an output value acquired by referencing a three-dimensional LUT based on the achromatic color input value, references the three-dimensional LUT based on a representative input value as a chromatic color input value to acquire a representative output value, sets color difference signal processing information such that the representative output value is obtained when the representative input value is subjected to gamma correction processing and color difference signal processing, and subjects an image signal to gamma correction processing and color difference signal processing.

12 Claims, 11 Drawing Sheets

| INPUT | | | OUTPUT | | |
|---|---|---|---|---|---|
| R | G | B | R | G | B |
| 0 | 0 | 0 | 0 | 0 | 0 |
| 16 | 0 | 0 | 10 | 5 | 5 |
| 32 | 0 | 0 | 20 | 10 | 10 |
| ... | 0 | 0 | ... | ... | ... |
| 255 | 0 | 0 | ... | ... | ... |
| 0 | 16 | 0 | ... | ... | ... |
| 16 | 16 | 0 | ... | ... | ... |
| 32 | 16 | 0 | ... | ... | ... |
| ... | 16 | 0 | ... | ... | ... |
| 255 | 16 | 0 | ... | ... | ... |
| ... | ... | ... | ... | ... | ... |
| 255 | 255 | 255 | 255 | 255 | 255 |

(56) References Cited

U.S. PATENT DOCUMENTS

2019/0188883 A1\* 6/2019 Takasumi ............... H04N 9/643
2019/0279340 A1\* 9/2019 Fujiwara .................. H04N 1/60

\* cited by examiner

FIG. 9

| INPUT | | | OUTPUT | | |
|---|---|---|---|---|---|
| R | G | B | R | G | B |
| 0 | 0 | 0 | 0 | 0 | 0 |
| 16 | 0 | 0 | 10 | 5 | 5 |
| 32 | 0 | 0 | 20 | 10 | 10 |
| ... | 0 | 0 | ... | ... | ... |
| 255 | 0 | 0 | ... | ... | ... |
| 0 | 16 | 0 | ... | ... | ... |
| 16 | 16 | 0 | ... | ... | ... |
| 32 | 16 | 0 | ... | ... | ... |
| ... | 16 | 0 | ... | ... | ... |
| 255 | 16 | 0 | ... | ... | ... |
| ... | ... | ... | ... | ... | ... |
| 255 | 255 | 255 | 255 | 255 | 255 |

FIG. 10

| INPUT | | | OUTPUT | | |
|---|---|---|---|---|---|
| R | G | B | R | G | B |
| 0 | 0 | 0 | 0 | 0 | 0 |
| 16 | 16 | 16 | 5 | 10 | 15 |
| 32 | 32 | 32 | 10 | 20 | 30 |
| ... | ... | ... | ... | ... | ... |
| 255 | 255 | 255 | 255 | 255 | 255 |

FIG. 11

| INPUT | OUTPUT | | |
|---|---|---|---|
| | R | G | B |
| 0 | 0 | 0 | 0 |
| 1 | 0 | 0 | 1 |
| 2 | 0 | 1 | 2 |
| 3 | 1 | 2 | 3 |
| ... | ... | ... | ... |
| 16 | 5 | 10 | 15 |
| ... | ... | ... | ... |
| 255 | 255 | 255 | 255 |

| COLOR DIFFERENCE DIRECTION | Cr CONVERSION TABLE CHARACTERISTIC | Cb CONVERSION TABLE CHARACTERISTIC |
|---|---|---|
| R DIRECTION |  |  |
| G DIRECTION |  |  |
| Cy DIRECTION |  |  |
| Mg DIRECTION |  |  |

IMAGE COLOR CONVERSION APPARATUS, NON-TRANSITORY COMPUTER-READABLE MEDIUM STORING COMPUTER PROGRAM, AND IMAGE COLOR CONVERSION METHOD

CROSS REFERENCE TO RELATED APPLICATION

This application claims benefit of Japanese Application No. 2017-242986 filed in Japan on Dec. 19, 2017, the entire contents of which are incorporated herein by this reference.

BACKGROUND OF THE INVENTION

1. Field of the Invention

The present invention relates to an image color conversion apparatus which subjects an image signal to color conversion based on a three-dimensional look-up table using three color components as a reference value, a non-transitory computer-readable medium storing a computer program, and an image color conversion method.

2. Description of the Related Art

A technique for subjecting an image signal to color conversion using a three-dimensional look-up table (abbreviated as a three-dimensional LUT or a 3D-LUT) using three color components as a reference value has been conventionally proposed.

The three-dimensional LUT is a table which is referenced based on three components constituting a color image signal to obtain a value of the three components after color conversion.

For example, a 24-bit color image signal constituted by three components one of which is represented by eight bits is given 256 gray levels (values 0 to 255) for one of the components. Accordingly, when three-dimensional LUTs respectively corresponding to all the gray levels are created, the number of coordinates (also referred to as lattice points because the coordinates are three-dimensional coordinates) to be referenced becomes a cube of 256 (approximately 17000000), whereby a data size becomes significantly large.

Therefore, a technique for respectively creating three-dimensional LUTs for discrete lattice points (e.g., discrete lattice points values of which are respectively 0, 16, 32, . . . , 255) and subjecting any input data to color conversion by interpolation calculation among the lattice points has been used.

At this time, the higher the density of the discrete lattice points is, the higher an accuracy of the color conversion becomes. However, the higher the density of the lattice points is, the larger a data size becomes.

Therefore, Japanese Patent Application Laid-Open Publication No. 2006-121530, for example, describes a technique for separating an input image signal into a higher-order bit and a lower-order bit, selecting lattices using a three-dimensional LUT based on a value of the higher-order bit, and performing interpolation calculation based on a value of the lower-order bit, to perform more highly accurate interpolation calculation without increasing the number of lattice points.

SUMMARY OF THE INVENTION

In an image color conversion apparatus according to an aspect of the present invention, a three-dimensional LUT is a three-dimensional look-up table configured to reference three components constituting a color image signal as an input value to acquire an output value of the three components after color conversion, the image color conversion apparatus including at least one processor configured as hardware, the at least one processor being configured to generate gamma correction processing information based on an achromatic color input value and the output value acquired by referencing the three-dimensional LUT based on the achromatic color input value, reference the three-dimensional LUT based on a representative input value as a chromatic color input value to acquire a representative output value, and set color difference signal processing information such that the representative output value is obtained when the representative input value is subjected to gamma correction processing based on the gamma correction processing information and color difference signal processing based on the color difference signal processing information, and subject the image signal to gamma correction processing based on the gamma correction processing information and color difference signal processing based on the color difference signal processing information.

In a non-transitory computer-readable medium storing a computer program according to another aspect of the present invention, a three-dimensional LUT is a three-dimensional look-up table configured to reference three components constituting a color image signal as an input value to acquire an output value of the three components after color conversion, and the computer program is a program for causing the computer to generate gamma correction processing information based on an achromatic color input value and the output value acquired by referencing the three-dimensional LUT based on the achromatic color input value, reference the three-dimensional LUT based on a representative input value as a chromatic color input value to acquire a representative output value, and set color difference signal processing information such that the representative output value is obtained when the representative input value is subjected to gamma correction processing based on the gamma correction processing information and color difference signal processing based on the color difference signal processing information, and subject the image signal to gamma correction processing based on the gamma correction processing information and color difference signal processing based on the color difference signal processing information.

In an image color conversion method according to still another aspect of the present invention, a three-dimensional LUT is a three-dimensional look-up table configured to reference three components constituting a color image signal as an input value to acquire an output value of the three components after color conversion, the image color conversion method including generating gamma correction processing information based on an achromatic color input value and the output value acquired by referencing the three-dimensional LUT based on the achromatic color input value, referencing the three-dimensional LUT based on a representative input value as a chromatic color input value to acquire a representative output value, and setting color difference signal processing information such that the representative output value is obtained when the representative input value is subjected to gamma correction processing based on the gamma correction processing information and color difference signal processing based on the color difference signal processing information, and subjecting the image signal to gamma correction processing based on the gamma correction processing information and color difference signal processing based on the color difference signal processing information.

BRIEF DESCRIPTION OF THE DRAWINGS

FIG. 9 is a chart illustrating an example of the three-dimensional LUT in the first embodiment;

FIG. 10 is a chart illustrating an example of a table of achromatic color lattice points extracted from the three-dimensional LUT in the first embodiment;

FIG. 11 is a chart illustrating an example of a gamma correction table for respective colors R, G, and B in the first embodiment;

DETAILED DESCRIPTION OF THE PREFERRED EMBODIMENT

An embodiment of the present invention will be described below with reference to the drawings.

First Embodiment

Figure 1:
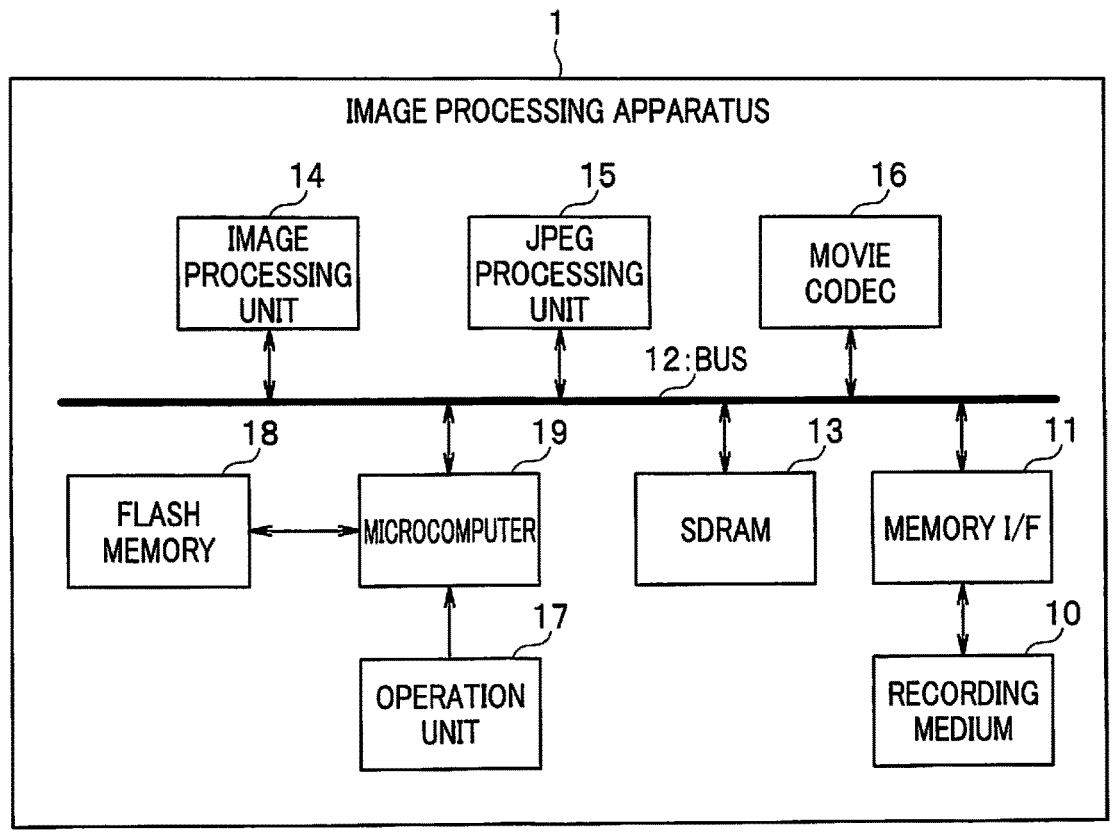
FIG. 1 is a block diagram illustrating a configuration of an image processing apparatus according to a first embodiment of the present invention.

FIGS. 1 to 17 illustrate a first embodiment of the present invention, where FIG. 1 is a block diagram illustrating a configuration of an image processing apparatus 1.

As illustrated in FIG. 1, the image processing apparatus 1 as an image color conversion apparatus is used to process a color image signal (also referred to as image data, as needed) having three components, and includes a recording medium 10, a memory interface (memory I/F) 11, a bus 12, an SDRAM (static random access memory) 13, an image processing unit 14, a JPEG (joint photographic experts group) processing unit 15, a movie codec 16, an operation unit 17, a flash memory 18, and a microcomputer 19.

The recording medium 10 is a recording unit including a memory card detachably attached to the image processing apparatus 1, for example, and storing image data (movie data, a still image data, etc.) in a nonvolatile manner. Therefore, the recording medium 10 need not have a configuration specific to the image processing apparatus 1.

The image data will be described as color image data having components in three RGB colors (R: red, G: green, and B: blue) as three components, for example, in the present embodiment. The color image data is obtained by photoelectrically converting an optical image of an object formed by a lens using a color image pickup device and subjecting the optical image to A/D (analog-to-digital) conversion in one example (however, the present invention is not limited to this).

The memory I/F 11 is a reading control unit configured to perform control to read out the image data recorded on the recording medium 10 and is also further a recording control unit configured to perform control to record image data after image processing on the recording medium 10.

The bus 12 is a transfer path configured to transfer various types of data and control signals from a certain location to another location within the image processing apparatus 1. The bus 12 in the present embodiment is connected to the memory I/F 11, the SDRAM 13, the image processing unit 14, the JPEG processing unit 15, the movie codec 16, and the microcomputer 19.

The image data read out of the recording medium 10 by the memory I/F 11 is transferred via the bus 12, and is stored once in the SDRAM 13.

The SDRAM 13 is a storage unit configured to temporarily store various types of data such as image data read out of the recording medium 10, image data processed or being processed by the image processing unit 14, and image data processed or being processed by the movie codec 16. The SDRAM 13 is also used as a work memory configured for the microcomputer 19 to temporarily store work data or the like.

The image processing unit 14 is a processor, and subjects the image data to various types of image processing, and generates an image for display or recording. The image processing unit 14 also performs color conversion processing for an image signal, as described below.

The JPEG processing unit 15 is a compression/decompression unit configured to compress or decompress still image data using JPEG processing. The still image data processed by the JPEG processing unit 15 is recorded as a JPEG file on the recording medium 10 via the memory I/F 11 after a header or the like is added to the still image data by the microcomputer 19.

The movie codec 16 compresses or decompresses the movie data using an optional processing system such as Motion JPEG or MPEG (moving picture experts group). The movie data processed by the movie codec 16 is recorded as a movie file on the recording medium 10 via the memory I/F 11 after a header or the like is added to the movie data by the microcomputer 19.

The operation unit 17 is used to subject the image processing apparatus 1 to various types of operation inputs, and can perform operations such as ON/OFF of power to the image processing apparatus 1, start/end of image processing, setting of various types of parameters in image processing, and reading and storage of an image file from and in the recording medium 10. When an operation is performed for the operation unit 17, a signal corresponding to an operation content is outputted to the microcomputer 19.

The flash memory 18 is a storage medium configured to store a computer program (including an image processing program (including an image color conversion program) as a program for performing an image processing method (including an image color conversion method) by the image processing apparatus 1) executed by the microcomputer 19 and various types of information on the image processing apparatus 1 in a nonvolatile manner. The information stored by the flash memory 18 is read by the microcomputer 19.

An example of the information stored by the flash memory 18 includes a parameter (including a white balance gain, a color matrix coefficient, etc.), a look-up table (a three-dimensional look-up table (abbreviated as a three-dimensional LUT (or a 3D-LUT) as appropriate) used for image processing, a gamma correction table, a degamma correction table, etc., as needed), a function, or a setting value set by a user.

More specifically, the flash memory 18 stores a three-dimensional LUT according to a condition relating to an image. The three-dimensional LUT is a three-dimensional look-up table configured to reference three components constituting a color image signal as an input value to acquire an output value of the three components after color conversion. Examples of the condition relating to the image include types of light sources such as daytime sunlight, morning and evening sun light, an electric bulb, and a fluorescent lamp used when the image has been shot, types of objects to be shot such as nature, a person, and a still life, and shooting conditions such as an exposure time period and ISO (international organization for standardization) sensitivity, or a spectral characteristic of an image pickup device which has shot the image. The condition relating to the image may be a color characteristic of an output device (e.g., a monitor or a printer) configured to output the image. Thus, as the three-dimensional LUT, a plurality of types of tables are previously prepared depending on the type of the light source, for example.

The microcomputer 19 is a processor and a control unit configured to integrally control the image processing apparatus 1. The microcomputer 19 reads a parameter or the like required for processing from the flash memory 18 according to a computer program stored in the flash memory 18 upon receiving an operation input of the user from the operation unit 17, and performs various types of sequences corresponding to an operation content.

When a target image is selected to start to perform image processing, for example, image data is read out via the memory I/F 11 from the recording medium 10 based on the control by the microcomputer 19, and is stored in the SDRAM 13 via the bus 12.

Further, the image processing unit 14 performs image processing based on the control by the microcomputer 19. In the image processing, color conversion processing approximate to color conversion processing performed when the three-dimensional LUT has been referenced based on the three-dimensional LUT (using the three-dimensional LUT as a base), as described below. Thus, the image data which has been subjected to the image processing by the image processing unit 14 is stored again in the SDRAM 13.

When the image data after the image processing is displayed on a display unit such as a monitor (or is printed by a printer, for example), the user can also perform image processing again by viewing an image displayed on the monitor (or a printed image, etc.) to change a setting value of a processing parameter, as needed.

The image data is subjected to JPEG compression by the JPEG processing unit 15 when still image data or is subjected to movie compression by the movie codec 16 when movie data, and is recorded as an image file on the recording medium 10.

Note that the image processing apparatus 1 may be configured as a dedicated processing apparatus, or may be configured to cause a computer to execute an image processing program. Alternatively, the image processing apparatus 1 may be incorporated into an image pickup apparatus such as a digital camera or an information terminal with a camera function and a telephone function.

Therefore, the image data is not necessarily inputted via the recording medium 10 but may be inputted via a communication line or the like, or may be image data acquired by shooting in the image processing apparatus 1 incorporated into the image pickup apparatus.

Figure 2:
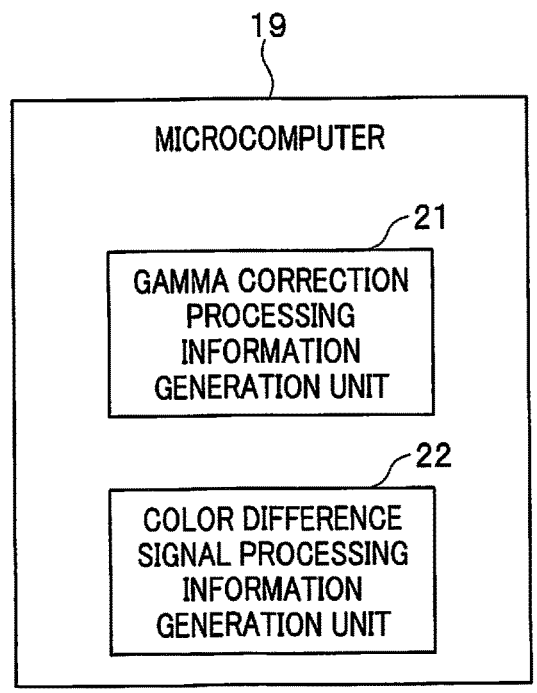
FIG. 2 is a block diagram illustrating a configuration of a microcomputer according to the first embodiment.

Then, FIG. 2 is a block diagram illustrating a configuration of the microcomputer 19.

The microcomputer 19 includes a gamma correction processing information generation unit 21 and a color difference signal processing information generation unit 22, and has a function of calculating color conversion information as information for performing color conversion.

The gamma correction processing information generation unit 21 generates gamma correction processing information (a part of the color conversion information) based on an achromatic color input value and an output value acquired by referencing the three-dimensional LUT based on the achromatic color input value. The gamma correction processing information generation unit 21 may be configured as a gamma correction processing information generation circuit.

The color difference signal processing information generation unit 22 references the three-dimensional LUT based on a representative input value (specifically, a representative lattice point, described below) as a chromatic color input value to acquire a representative output value, and sets color difference signal processing information (another part of the color conversion information) such that the representative output value is obtained when the representative input value is subjected to gamma correction processing based on the gamma correction processing information and color difference signal processing based on the color difference signal processing information. The color difference signal processing information generation unit 22 may be configured as a color difference signal processing information generation circuit.

At this time, the color difference signal processing information generation unit 22 performs setting of the chromatic color input value as the representative input value for at least one chromatic color input value, to set at least one color difference signal processing information. Particularly, the color difference signal processing information generation unit 22 in the present embodiment performs setting of the chromatic color input value as the representative input value for a plurality of chromatic color input values respectively having different hues, to set color difference signal processing information corresponding to the plurality of hues.

The gamma correction processing information generation unit 21 and the color difference signal processing information generation unit 22 will be described in detail below.

Figure 3:
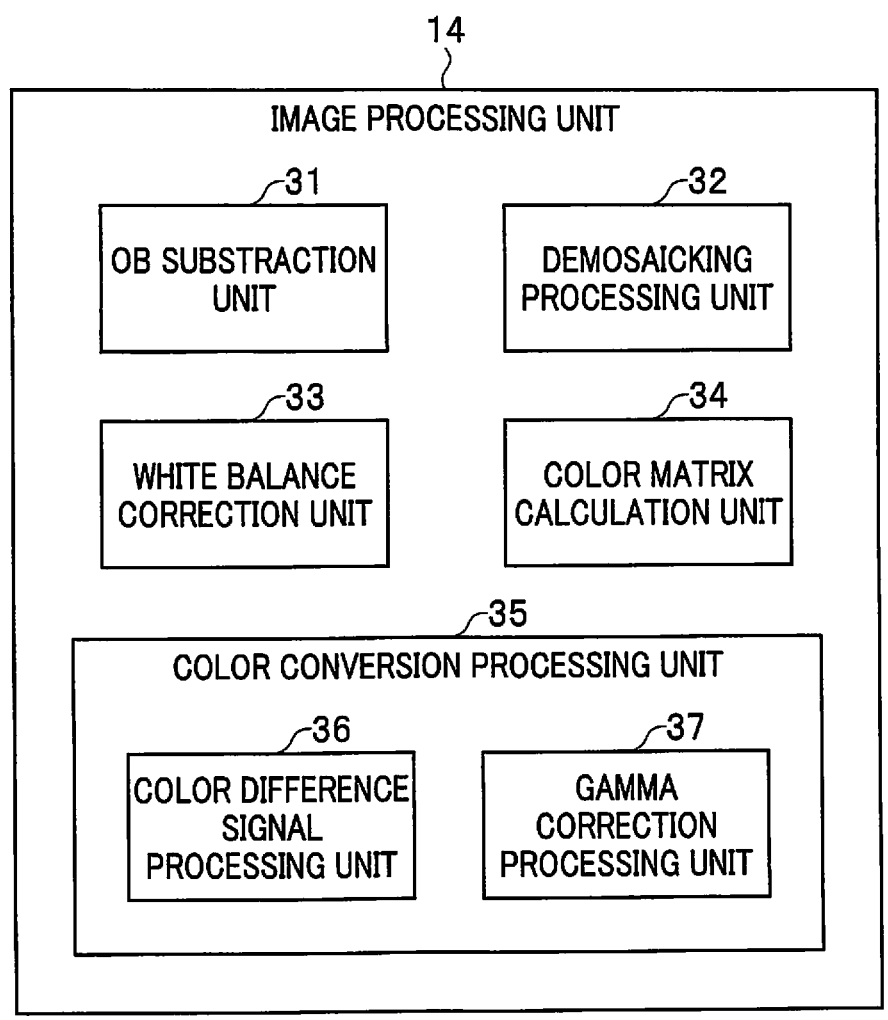
FIG. 3 is a block diagram illustrating a configuration of an image processing unit according to the first embodiment.

Then, FIG. 3 is a block diagram illustrating a configuration of the image processing unit 14.

As illustrated in FIG. 3, the image processing unit 14 includes an OB (optical black) subtraction unit 31, a demosaicking processing unit 32, a white balance correction unit 33, a color matrix calculation unit 34, and a color conversion processing unit 35.

The OB subtraction unit 31 subtracts, when image data contains an OB (optical black) component, the OB component. Therefore, if the image data contains the OB component, the OB component is also recorded on the recording medium 10 and is read out by the memory I/F 11.

The demosaicking processing unit 32 performs demosaicking processing when an image is an RGB Bayer image, for example. That is, the demosaicking processing unit 32 performs, in the RGB Bayer image in which only a color signal in one color exists for each of pixels, interpolation of the missing color signal in the pixel based on the color signals of the same color in the pixels in the vicinity of the pixel for the respective missing color signals in the pixels, to generate an image in which RGB color signals exist for each of the pixels.

The white balance correction unit 33 subjects the color image signal to white balance correction based on the white balance gain read out of the flash memory 18 by the microcomputer 19. The white balance correction is color balance correction for an object in white to look white on an image.

The color matrix calculation unit 34 performs processing for constituting RGB signals in each of pixel data constituting image data as a matrix of three rows and one column (or may be one row and three columns), for example, and calculating the pixel data using a color matrix of three rows and three columns, to convert a color space. Color matrix coefficients constituting the color matrix of three rows and three columns are read out of the flash memory 18 by the microcomputer 19.

The color conversion processing unit 35 performs color conversion processing such that a color (chromaticity, saturation, and hue) of an image becomes appropriate depending on conditions relating to the image (a condition relating to the image such as a light source, a color characteristic of an output device such as a monitor, etc.). The color conversion processing unit 35 may be configured as a color conversion processing circuit.

More specifically, the color conversion processing unit 35 according to the present embodiment includes a color difference signal processing unit 36 configured to subject an image signal to color difference signal processing based on color difference signal processing information generated by the color difference signal processing information generation unit 22 and a gamma correction processing unit 37 configured to perform gamma correction processing based on the gamma correction processing information generated by the gamma correction processing information generation unit 21. The color difference signal processing unit 36 may be configured as a color difference signal processing circuit, and the gamma correction processing unit 37 may be configured as a gamma correction processing circuit.

Figure 4:
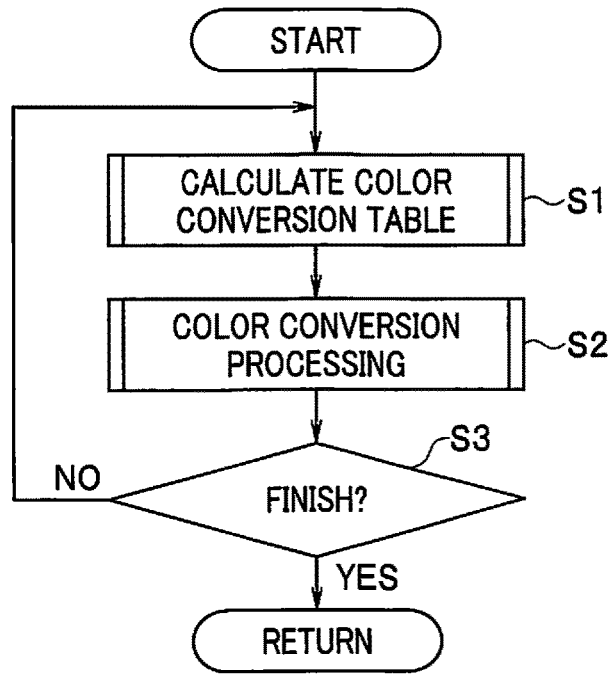
FIG. 4 is a flowchart illustrating processing relating to color conversion in the image processing apparatus according to the first embodiment.

FIG. 4 is a flowchart illustrating processing relating to color conversion in the image processing apparatus 1. Note that detailed description is omitted for processing other than the processing relating to the color conversion in the image processing apparatus 1.

When the processing is started, a three-dimensional LUT is selected depending on a condition relating to an image to be processed, and the microcomputer 19 calculates color conversion information for performing color conversion for an image signal (although the color conversion information is a color conversion table configured as a table in the present embodiment, the present invention is not limited to this, but may be information in forms such as a functional form) based on the selected three-dimensional LUT (step S1). The gamma correction processing information generation unit 21 calculates gamma correction processing information as a part of the color conversion information (color conversion table) while the color difference signal processing information generation unit 22 calculates color difference signal processing information as another part of the color conversion information (color conversion table), as described above.

Then, the color conversion processing unit 35 performs color conversion processing for the image signal using the calculated color conversion table (step S2). More specifically, the color difference signal processing unit 36 performs color conversion processing relating to a color difference signal using the color difference signal processing information, and the gamma correction processing unit 37 performs color conversion processing for each of colors of the image signal using the gamma correction processing information (a processing order of the color difference signal processing and the gamma correction processing will be described below).

Then, it is determined whether the processing is finished (step S3). If processing for another image is further performed, the processing returns to step S1. In step S1, the above-described processing is performed. Therefore, another three-dimensional LUT is selected for the other image so that another color conversion processing may be performed (that is, which of the three-dimensional LUTs is to be selected and how color conversion processing is to be performed depend on the image to be processed).

On the other hand, if it is determined that the processing is finished in step S3, the processing returns to main processing or the like (not illustrated).

Note that, although the image processing apparatus 1 has performed both the calculation of the color conversion table and the color conversion processing in the configuration example illustrated in FIGS. 1 to 4, a processing load is preferably reduced in a mobile device such as a digital camera or an information terminal with a camera function and a telephone function.

A configuration example in which the calculation of the color conversion table and the color conversion processing are respectively performed using separate apparatuses will be described with reference to FIGS. 5 and 6.

Figure 5:
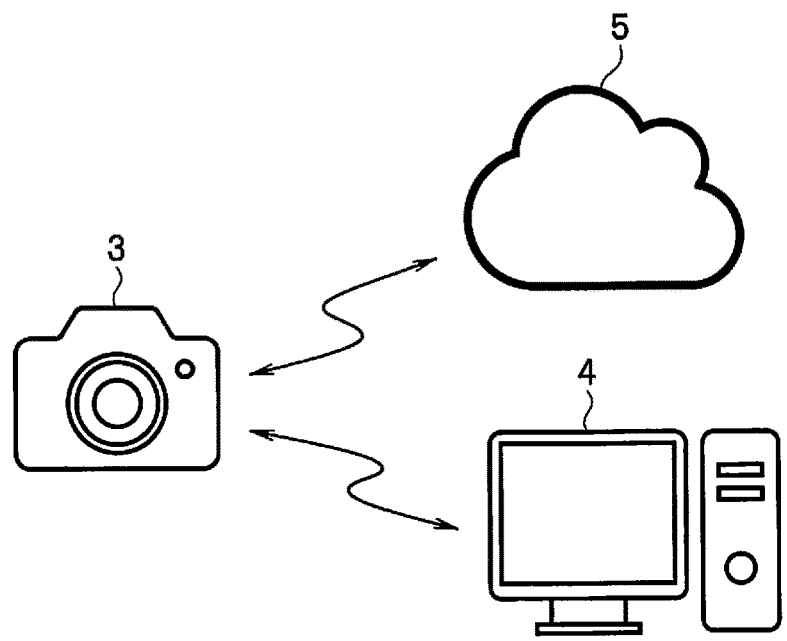
FIG. 5 is a diagram illustrating an example of a configuration in which an apparatus other than an apparatus which performs color conversion processing calculates a color conversion table in the first embodiment.

FIG. 5 is a diagram illustrating a configuration example in which the color conversion table is calculated using an apparatus other than an apparatus which performs the color conversion processing. Note that FIG. 5 illustrates an example of a case where the mobile device is the digital camera 3.

The digital camera 3 is a device which performs color conversion processing for an image acquired by shooting. A color conversion table required for the color conversion processing is acquired from a computer 4 or a cloud (cloud computing) 5 which is connected via a communication line, for example.

Therefore, the three-dimensional LUT, the gamma correction processing information generation unit 21, and the color difference signal processing information generation unit 22 are provided in the computer 4 or the cloud 5, and the color conversion processing unit 35 (the color difference signal processing unit 36 and the gamma correction processing unit 37) is provided in the digital camera 3. Thus, the components illustrated in FIG. 1, for example, may be arranged while being dispersed among a plurality of apparatuses.

Figure 6:
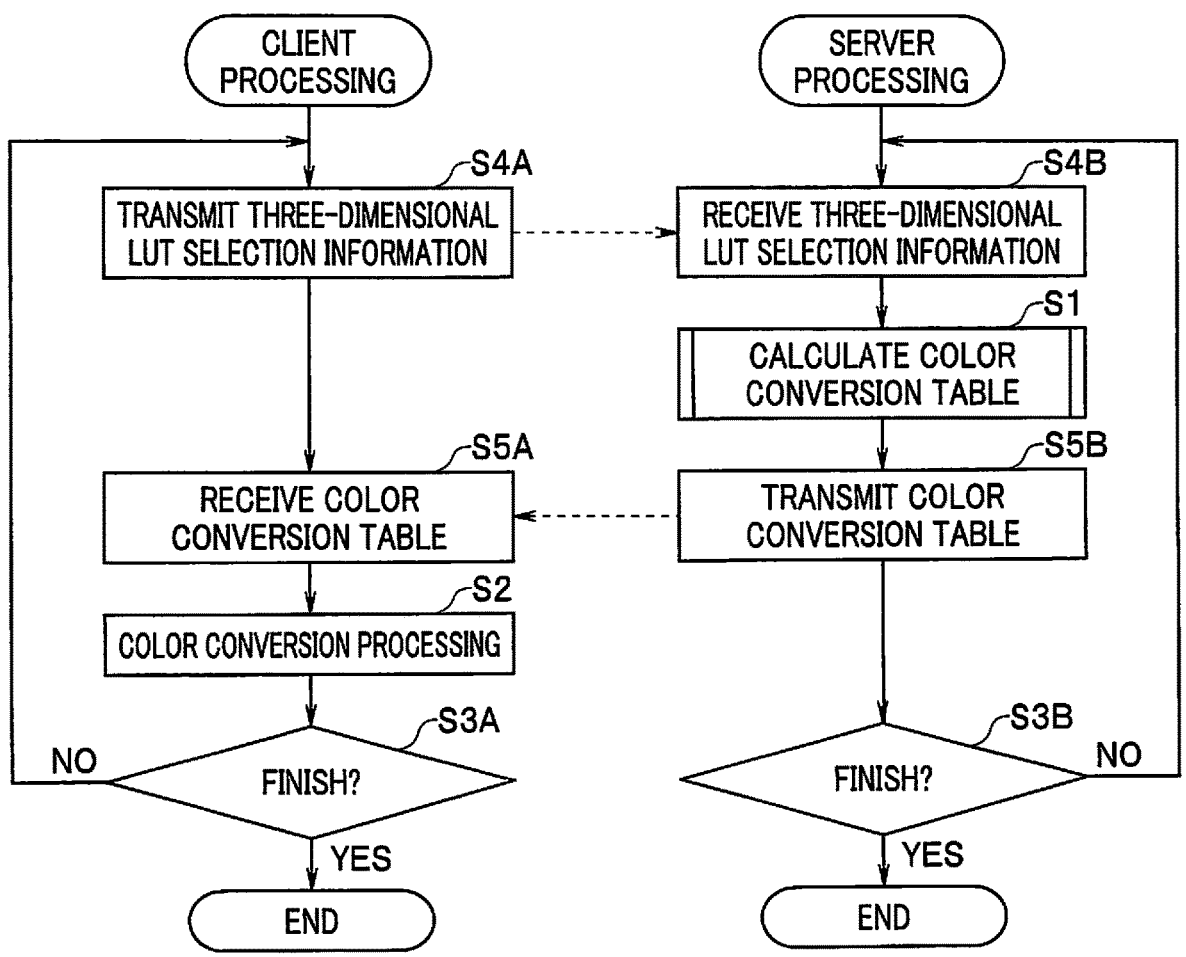
FIG. 6 is a flowchart illustrating an example of processing relating to color conversion in the configuration illustrated in FIG. 5 in the first embodiment.

FIG. 6 is a flowchart illustrating an example of processing relating to color conversion in a configuration illustrated in FIG. 5.

In FIG. 6, the digital camera 3 is a client, and the computer 4 or the cloud 5 is a server.

When the processing is started, the client transmits three-dimensional LUT selection information for selecting a three-dimensional LUT, for example, a type of light source used when an image has been shot, to the server (step S4A).

The server receives the three-dimensional LUT selection information from the client (step S4B).

Consequently, the server selects a three-dimensional LUT used for the color conversion based on the received three-dimensional LUT selection information, and calculates a color conversion table, as described above in step S1, based on the selected three-dimensional LUT.

The server transmits the calculated color conversion table to the client (step S5B).

The client receives the color conversion table from the server (step S5A).

The client performs color conversion processing for an image signal, as described above in step S2, using the received color conversion table.

Then, the client determines whether the processing is finished (step S3A). If processing for another image is further performed, the processing returns to step S4A. In step S4A, the above-described processing is performed. If it is determined that the processing is finished, the processing ends.

After processing in step S5B is performed, like in the server, it is determined whether the processing is finished (step S3B). If a request to further perform the processing for the other image is issued from the client, the processing returns to step S4B. In step S4B, the above-described processing is performed. If it is determined that the processing is finished, the processing ends.

Figure 7:
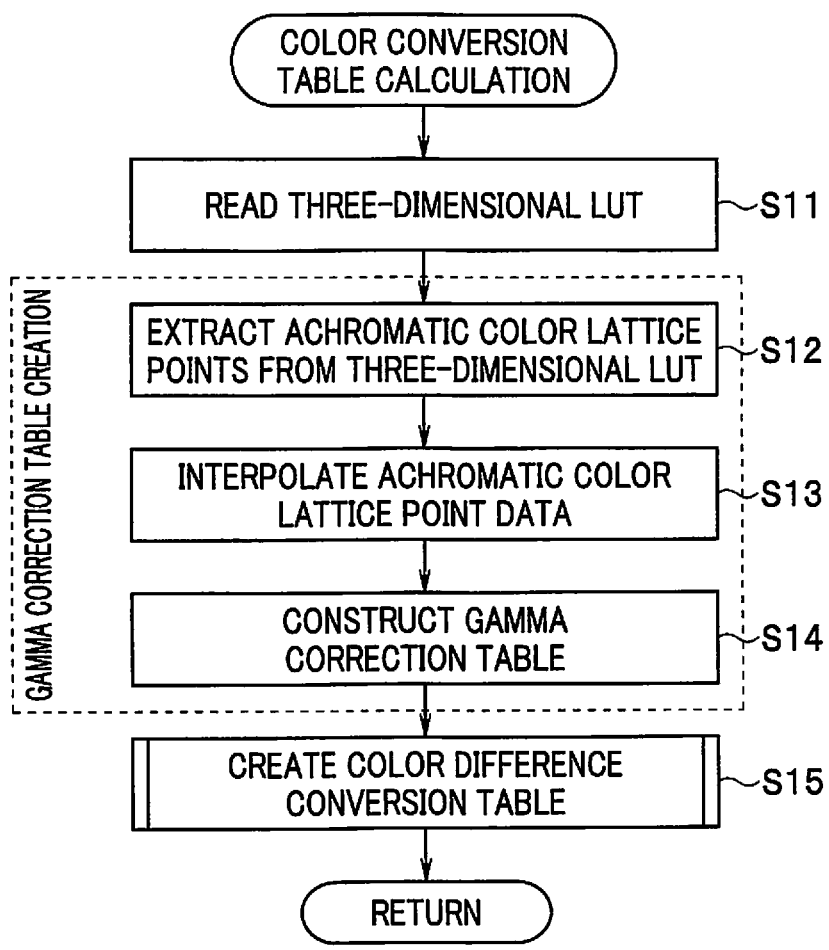
FIG. 7 is a flowchart illustrating details of color conversion table calculation processing in step S1 illustrated in FIG. 4 or 6 in the first embodiment.

Then, FIG. 7 is a flowchart illustrating details of the processing for calculating the color conversion table in step S1 illustrated in FIG. 4 or 6. Note that the following description is performed, assuming the configuration illustrated in FIGS. 1 to 3.

When the processing is started, the microcomputer 19 reads the selected three-dimensional LUT from the flash memory 18 (step S11).

Figure 8:
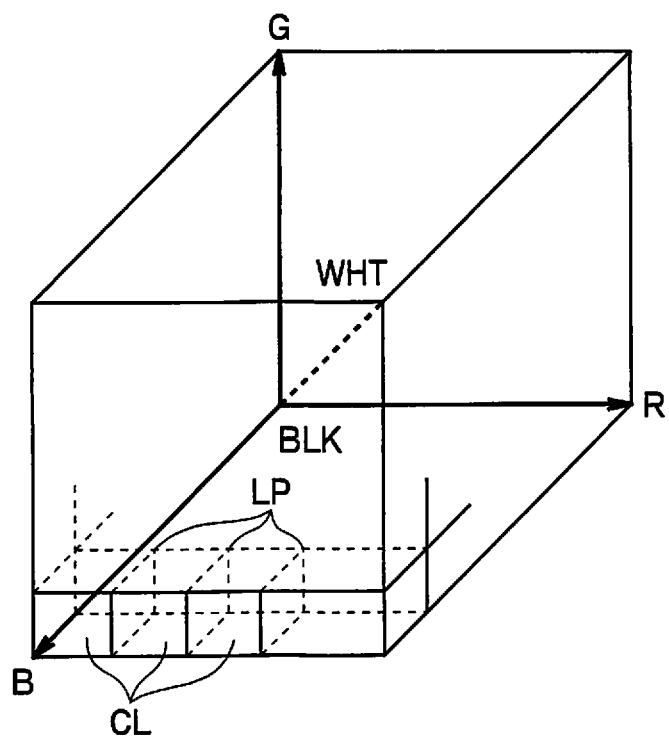
FIG. 8 is a diagram illustrating a reference value in a three-dimensional LUT as three-dimensional coordinates in the first embodiment.

FIG. 8 is a diagram illustrating a reference value in a three-dimensional LUT as three-dimensional coordinates, and FIG. 9 is a chart illustrating an example of the three-dimensional LUT.

The three-dimensional LUT is a table in which, when a combination (R, G, B) of RGB values of each of pixels composing a color image signal is referenced as an input value (reference value), a combination (R, G, B) of the RGB values after color conversion is obtained as an output value (see FIG. 9). Since the number of components (the number of coordinates) to be referenced is three, the three-dimensional LUT is referred to as a three-dimensional table.

In a digital image signal, a pixel value is represented by an integer. Accordingly, reference coordinates, which are composed of a combination of integers when represented by a three-dimensional orthogonal coordinate system, are positioned on a cubic lattice and are also referred to as a lattice point (see a lattice point LP illustrated in FIG. 8).

The three-dimensional LUT is table data constructed only for lattice points as input values which are discrete (that is, are not continuous as integer values) to reduce a data size. When a case where a color image signal is composed of 24 bits and each of colors R, G, and B is represented by eight bits and takes any one of values 0 to 255 is taken as an example, a straight line indicated by a dotted line connecting a black BLK satisfying (R, G, B)=(0, 0, 0) and white WHT satisfying (R, G, B)=(255, 255, 255) is a luminance axis passing through achromatic color lattice points.

A three-dimensional LUT illustrated in FIG. 9 is constructed only for discrete lattice points each having RGB values each taking 0, 16, 32, . . . , 240, 255 (therefore, assuming that any input value is subjected to interpolation calculation among the lattice points). That is, the three-dimensional LUT is configured to have a value for each of lattice points in a lattice group constructed by 16×16×16 cubic lattices CL (see FIG. 8) and also have a value for each of points (255, G, B), (R, 255, B), and (R, G, 255) at which at least one of colors R, G, and B is saturated using an origin (0, 0, 0) as a base point.

Therefore, the number of reference coordinates in the three-dimensional LUT illustrated in FIG. 9 is $(256/16+1)^3=17^3=4913$ (where a sign "^" denotes a power, and "^3" denotes a cube). Therefore, a data size is significantly made smaller than the number of reference coordinates $256^3 \approx 17000000$ in a three-dimensional LUT constructed for lattice points as input values which are continuous (continuous as integer values).

Then, the gamma correction processing information generation unit 21 performs gamma correction table creation processing in steps S12 to S14 based on the read three-dimensional LUT.

That is, achromatic color lattice points, here, lattice points satisfying R=G=B are first extracted from the three-dimensional LUT (step S12). Thus, three RGB color components are used as three components. Accordingly, a luminance axis passing through the achromatic color lattice points is easy to extract. FIG. 10 is a chart illustrating an example of a table of the achromatic color lattice points extracted from the three-dimensional LUT.

Then, the table of the achromatic color lattice points respectively having output values only for discrete input values 0, 16, 32, . . . , 240, 255 is subjected to interpolation calculation, to calculate the output values corresponding to the input values 0, 1, 2, . . . , 254, 255 for each of the colors R, G, and B (step S13).

A gamma correction table for each of the colors R, G, and B is created as gamma correction processing information based on the table of the achromatic color lattice points which has been subjected to the interpolation calculation (step S14). FIG. 11 is a chart illustrating an example of a gamma correction table for each of colors R, G, and B. FIG. 11 collectively describes respective input values for each of the colors R, G, and B. Output values in an R column may be outputted, respectively, if the input values 0 to 255 are R, output values in a G column may be outputted, respectively, if the input values are G, and output values in a B column may be outputted, respectively, if the input values are B (an R gamma correction table, a G gamma correction table, and a B gamma correction table may be separately created).

Thus, the gamma correction processing information generation unit 21 interpolates discrete achromatic color input values and output values acquired by referencing the three-dimensional LUT based on the discrete achromatic color input values, to generate gamma correction processing information also giving an intermediate correspondence between the achromatic color input values and the output values.

That is, the gamma correction processing information generation unit 21 generates, based on achromatic color input values which are the same in each of RGB color components and RGB output values acquired by referencing the three-dimensional LUT based on the achromatic color input values, gamma correction processing information including R gamma correction processing information giving an R output value after gamma correction processing for an R input value, G gamma correction processing information giving a G output value after gamma correction processing for a G input value, and B gamma correction processing information giving a B output value after gamma correction processing for a B input value.

If processing in step S14 is performed, processing for creating a color difference conversion table is then performed (step S15).

Figure 12:
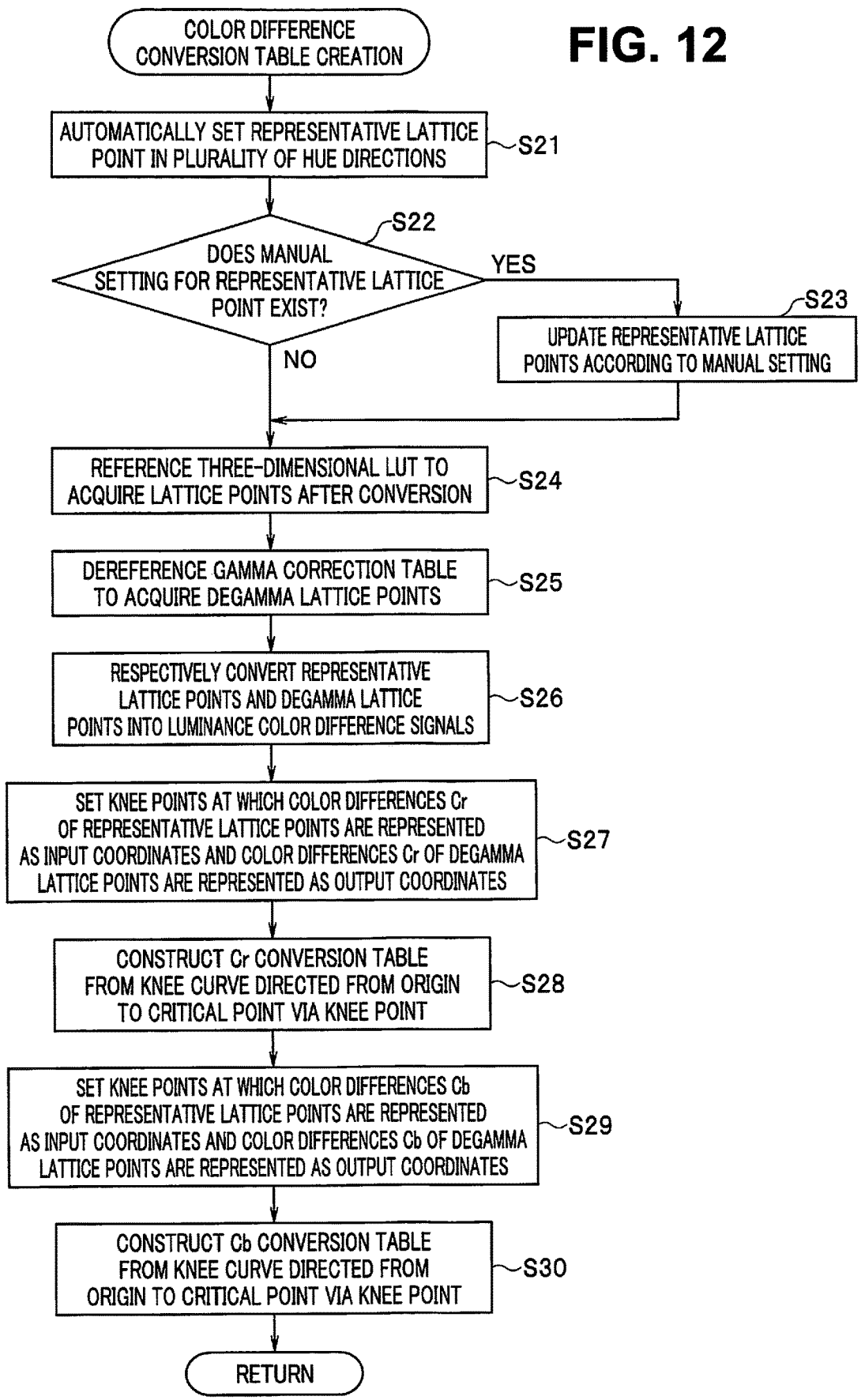
FIG. 12 is a flowchart illustrating color difference conversion table creation processing in step S15 illustrated in FIG. 7 in the first embodiment.

FIG. 12 is a flowchart illustrating the color difference conversion table creation processing in step S15 illustrated in FIG. 7. The color difference conversion table creation processing is performed by the color difference signal processing information generation unit 22.

When the processing is started, representative lattice points as representative input values are automatically set in at least one hue direction and practically in a plurality of hue directions (step S21).

Figure 13:
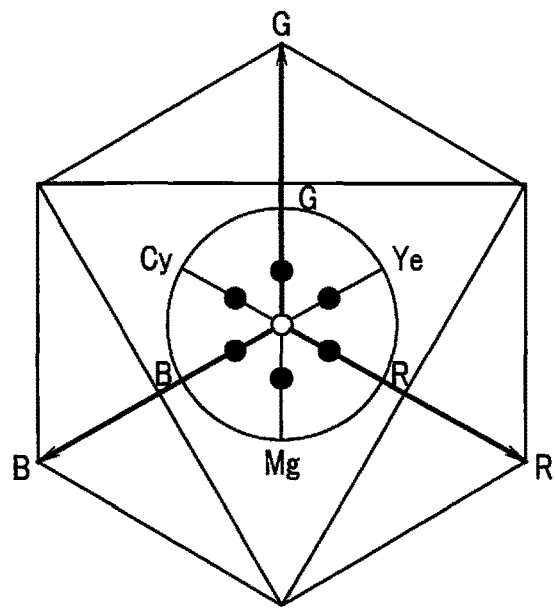
FIG. 13 is a diagram illustrating an example of some of hue directions in an RGB color space viewed in a luminance axis direction in the first embodiment.

FIG. 13 is a diagram illustrating an example of some of hue directions in an RGB color space viewed in a luminance axis direction.

In the RGB color space, a straight line satisfying R=G=B (a straight line indicated by a dotted line in FIG. 8 and indicated by a white circle in FIG. 13) is a luminance axis passing through all achromatic color lattice points which differ in luminance. Lattice points, respectively having hues, such as G, Ye, R, Mg, B, and Cr exist around the luminance axis. Note that FIG. 13 illustrates an example of the lattice points respectively having the hues each having a low saturation close to the luminance axis on a plane perpendicular to the luminance axis at a high luminance intermediate between a middle luminance (e.g., (R, G, B)=(128, 128, 128)) and white WHT (see FIG. 8).

As the representative lattice point, a point at which a similar result to a result obtained when color conversion has been performed using a three-dimensional LUT is found, i.e., a point at which a high conversion accuracy is found is selected. Therefore, the representative lattice point is preferably a lattice point having a color in which a color conversion error (color shift) is visually easily-noticeable or a lattice point having a color which is easily emphasized as a memory color by a person, for example.

Examples of the color which is visually easily-noticeable include a chromatic color having a high luminance and a low saturation (see a point indicated by a black circle in FIG. 13). Examples of the color which is easily emphasized as a memory color by a person include a chromatic color corresponding to a skin color, a chromatic color corresponding to a green color of a plant, and a chromatic color corresponding to a blue color of a sky. Therefore, the chromatic color having a high luminance and a low saturation may be set as the representative lattice point, at least one of the chromatic color corresponding to a skin color, the chromatic color corresponding to a green color of a plant, and the chromatic color corresponding to a blue color of a sky may be set as the representative lattice point, or both may be combined with each other, as needed.

Figure 14:
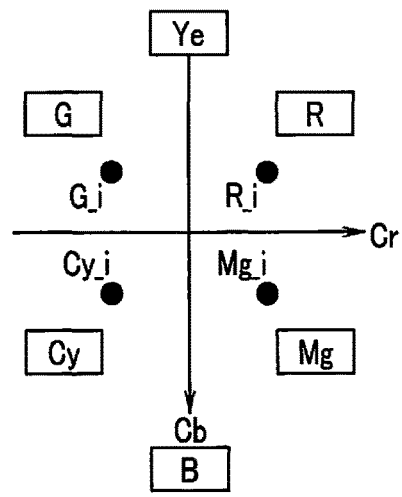
FIG. 14 is a diagram illustrating representative lattice points R_i, G_i, Cy_i, and Mg_i plotted on a color difference plane in the first embodiment.

FIG. 14 is a diagram illustrating representative lattice points R_i, G_i, Cy_i, and Mg_i plotted on a color difference plane (CrCb plane).

In an example illustrated in FIG. 14, one representative lattice point is set in each of four quadrants of the color difference plane, where the representative lattice point R_i, the representative lattice point G_i, the representative lattice point Cy_i, and the representative lattice point Mg_i are respectively set in the first quadrant, the second quadrant, the third quadrant, and the fourth quadrant.

Then, it is determined whether manual setting for the representative lattice points exists (step S22). That is, which of colors is emphasized can be manually set by the user.

If it is determined that the manual setting exists, the representative lattice points are updated according to the manual setting (step S23).

If it is determined that step S23 is performed or the manual setting does not exist in step S22, the three-dimensional LUT as illustrated in FIG. 9 is referenced respectively using RGB values of each of the representative lattice points R_i, G_i, Cy_i, and Mg_i as representative input values, to respectively acquire representative lattice points R_o, G_o, Cy_o, and Mg_o after color conversion as representative output values (step S24).

Therefore, it is preferable that discrete lattice points (i.e., points each having RGB values each taking 0, 16, 32, . . . , 240, 255 and output values are respectively immediately obtained with reference to FIG. 9) are respectively selected as the representative lattice points R_i, G_i, Cy_i, and Mg_i because the need for interpolation calculation is eliminated.

A gamma correction table (a gamma correction table as illustrated in FIG. 11 created in step S14) is dereferenced respectively using RGB values of each of the representative lattice points R_o, G_o, Cy_o, and Mg_o after color conversion as reference values (an input value corresponding to an output value most approximate to the reference value is obtained), to respectively acquire degamma lattice points R_c, G_c, Cy_c, and Mg_c obtained by subjecting the representative lattice points R_o, G_o, Cy_o, and Mg_o after color conversion to degamma conversion as intermediate representative values (step S25).

If Cy is taken as an example, when degamma conversion is represented as DegammaR, DegammaG, and DegammaB, respectively, for the colors R, G, and B, RGB values of the degamma lattice point Cy_c are respectively acquired as follows:

$$R(Cy\_c)=DegammaR(R(Cy\_o))$$

$$G(Cy\_c)=DegammaG(G(Cy\_o))$$

$$B(Cy\_c)=DegammaB(B(Cy\_o))$$

Note that, although degamma conversion is performed by dereferencing the gamma correction table, a degamma correction table may be separately created and referenced.

In the processing so far performed, RGB values of each of the representative lattice point Cy_i as a representative input value, the representative lattice point Cy_o after color conversion as a representative output value, and the degamma lattice point Cy_c as an intermediate representative value are respectively acquired as follows:

$$Cy\_i:(R(Cy\_i),G(Cy\_i),B(Cy\_i))$$

$$Cy\_o:(R(Cy\_o),G(Cy\_o),B(Cy\_o))$$

$$Cy\_c:(R(Cy\_c),G(Cy\_c),B(Cy\_c))$$

Figure 15:
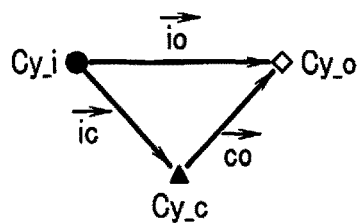
FIG. 15 is a diagram illustrating a relationship among the representative lattice point Cy_i, a representative lattice point Cy_o after color conversion, and a degamma lattice point Cy_c obtained by subjecting the representative lattice point Cy_o after color conversion to degamma conversion.

FIG. 15 is a diagram illustrating a relationship among the representative lattice point Cy_i, the representative lattice point Cy_o after color conversion, and the degamma lattice point Cy_c obtained by subjecting the representative lattice point Cy_o after color conversion to degamma conversion. Although FIG. 15 illustrates a relationship relating to the representative lattice point Cy_i as an example, a similar relationship to the relationship relating to the representative lattice point Cy_i exists for the other representative lattice points R_i, G_i, and Mg_i.

Then, the color difference signal processing information generation unit 22 subjects respective representative input values (representative lattice points) of three components (e.g., R, G, and B) to luminance color difference conversion to acquire a representative input luminance value (a luminance value of the representative lattice point) of the one component and respective representative input color difference values (color difference values of the representative lattice points) of the two components, and subjects respective intermediate representative values (degamma lattice points) of the three components (R, G, and B) to luminance color difference conversion to acquire an intermediate representative luminance value (a luminance value of the degamma lattice point) of the one component and respective intermediate representative color difference values (color difference values of the degamma lattice points) of the two components.

That is, the representative lattice points R_i, G_i, Cy_i, and Mg_i as representative input values and the degamma lattice points R_c, G_c, Cy_c, and Mg_c as intermediate representative values are respectively converted from pixel values in the RGB color space to pixel values in a luminance color difference space (step S26).

As a result, Y(Cy_i), Cr(Cy_i), and Cb(Cy_i) and Y(Cy_c), Cr(Cy_c), and Cb(Cy_c) are obtained for Cy, for example (the same is true for R, G, and Mg).

Processing for respectively setting Knee curves for color differences Cr and Cb to construct color difference conversion tables (a Cr conversion table and a Cb conversion table) is performed. Although an example in which the Cr conversion table is constructed and the Cb conversion table is then constructed is illustrated, a processing order of the Cr conversion table and the Cb conversion table may be reversed, or the Cr conversion table and the Cb conversion table may be constructed in parallel (concurrently).

That is, Knee points (break points in the Knee curve) at which color differences Cr(R_i), Cr(G_i), Cr(Cy_i), and Cr(Mg_i) of the representative lattice points R_i, G_i, Cy_i, and Mg_i are each represented as input (in) coordinates and color differences Cr(R_c), Cr(G_c), Cr(Cy_c), and Cr(Mg_c) of the degamma lattice points R_c, G_c, Cy_c, and Mg_c are each represented as output (out) coordinates are respectively set for color difference directions of R, G, Cy, and Mg (step S27).

Figure 16:
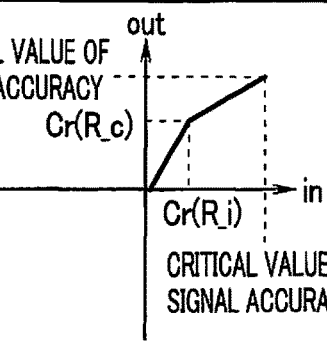
FIG. 16 is a chart illustrating an example of Knee curves respectively set for color differences Cr and Cb in the first embodiment.
Figure 16:
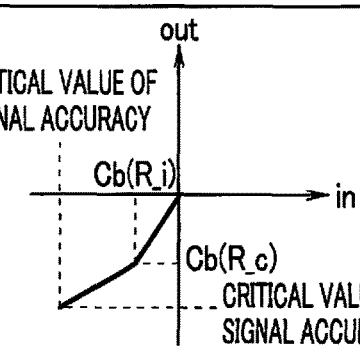
Figure 16:
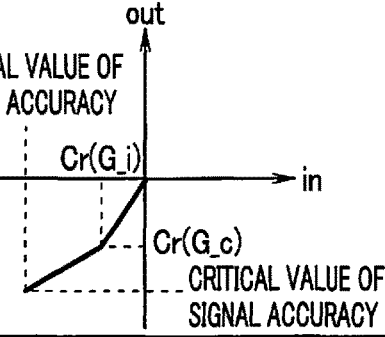
Figure 16:
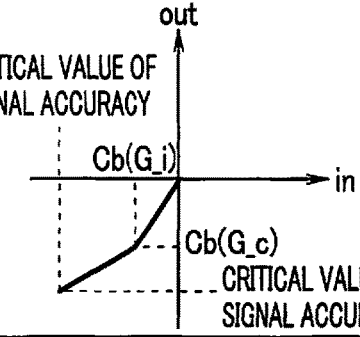
Figure 16:
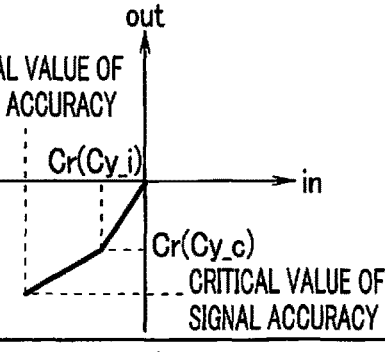
Figure 16:
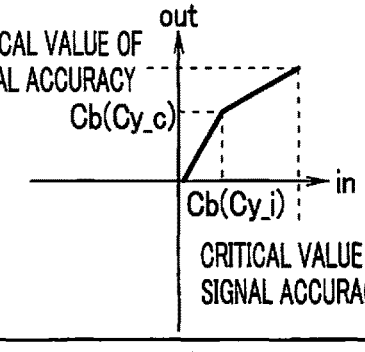
Figure 16:
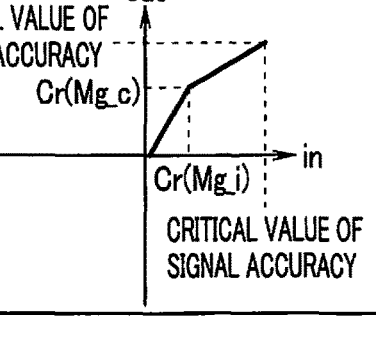
Figure 16:
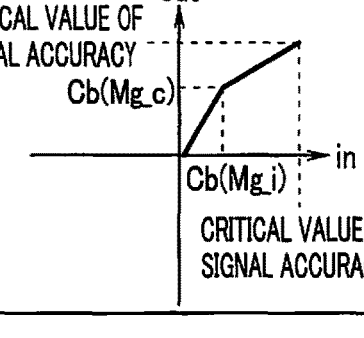

In addition, a Knee curve directed from an origin to a critical point via a Knee point is set, as illustrated in FIG. 16, to construct a correspondence relationship between an input value and an output value represented by the Knee curve as a Cr conversion table (step S28).

FIG. 16 is a chart illustrating examples of the Knee curves respectively set for the color differences Cr and Cb. A critical point is a point given by an upper-limit value (critical value) of each of the color differences Cr and Cb determined based on a signal accuracy of a pixel value (e.g., R=0 to 255, G=0 to 255, and B=0 to 255 as an accuracy of an 8-bit signal).

Similarly, Knee points (break points in the Knee curve) at which color differences Cb(R_i), Cb(G_i), Cb(Cy_i), and Cb(Mg_i) of the representative lattice points R_i, G_i, Cy_i, and Mg_i are each represented as input (in) coordinates and color differences Cb(R_c), Cb(G_c), Cb (Cy_c), and Cb(Mg_c) of the degamma lattice points R_c, G_c, Cy_c, and Mg_c are each represented as output (out) coordinates are respectively set for color difference directions of R, G, Cy, and Mg (step S29).

In addition, a Knee curve directed from an origin to a critical point via a Knee point is set, as illustrated in FIG. 16, to construct a correspondence relationship between an input value and an output value represented by the Knee curve as a Cb conversion table (step S30).

In an R direction, for example, in FIG. 16, R is in a color difference region of Cr>0 and Cb<0, as can be seen with reference to FIG. 14. Accordingly, in a graph using an input (in) to enter a horizontal axis and using an output (out) to enter a vertical axis, both Cr (R_i) as an input and Cr (R_c) as an output of a Knee point become positive to constitute a Knee curve in the first quadrant, and both Cb (R_i) as an input and Cb (R_c) as an output of a Knee point become negative to constitute a Knee curve in the third quadrant. In each of the other G-direction, Cy direction, and Mg direction illustrated in FIG. 16, a quadrant of the Knee curve is also determined in a similar manner.

If a Cr conversion table characteristic in the R direction is taken as an example of the Knee curve, a straight line from an origin to a Knee point is represented as:

$$\text{out} = \{Cr(R\_c)/Cr(R\_i)\}\text{in}$$

A straight line from a Knee point to a critical point is represented, if a critical value is taken as Crlm, as:

$$\text{out} = [\{Crlm - Cr(R\_c)\}/Crlm - Cr(R\_i)\}] \times \{\text{in} - Cr(R\_i)\} + Cr(R\_c)$$

The same is true for a Cb conversion table characteristic and the other color difference directions.

Thus, the color difference signal processing information generation unit 22 sets color difference signal processing information where a representative input color difference value is converted into an intermediate representative color difference value for each of respective color difference values (Cr and Cb) of the two components. At this time, the color difference signal processing information generation unit 22 generates, on a plane giving an output color difference value corresponding to an input color difference value, color difference signal processing information corresponding to a Knee curve (see FIG. 16) passing through an origin at which an input color difference value is zero and an output color difference value is zero, a Knee point at which the input color difference value is a representative input color difference value and the output color difference value is an intermediate representative color difference value, and a critical point including an upper-limit value of the input color difference value and an upper-limit value of the output color difference value for each of the color difference values (Cr and Cb) of the two components.

If processing in step S30, described above, is performed, the processing returns to the processing illustrated in FIG. 7.

Thus, the color conversion table based on the three-dimensional LUT according to the present embodiment includes the gamma correction table created by the gamma color correction processing information generation unit 21 and the color difference conversion tables (the Cr conversion table and the Cb conversion table) created by the color difference signal processing information generation unit 22, as illustrated in FIG. 7.

When the color conversion table is created, the color conversion processing unit 35 performs color conversion processing for the image signal based on the color conversion table.

Figure 17:
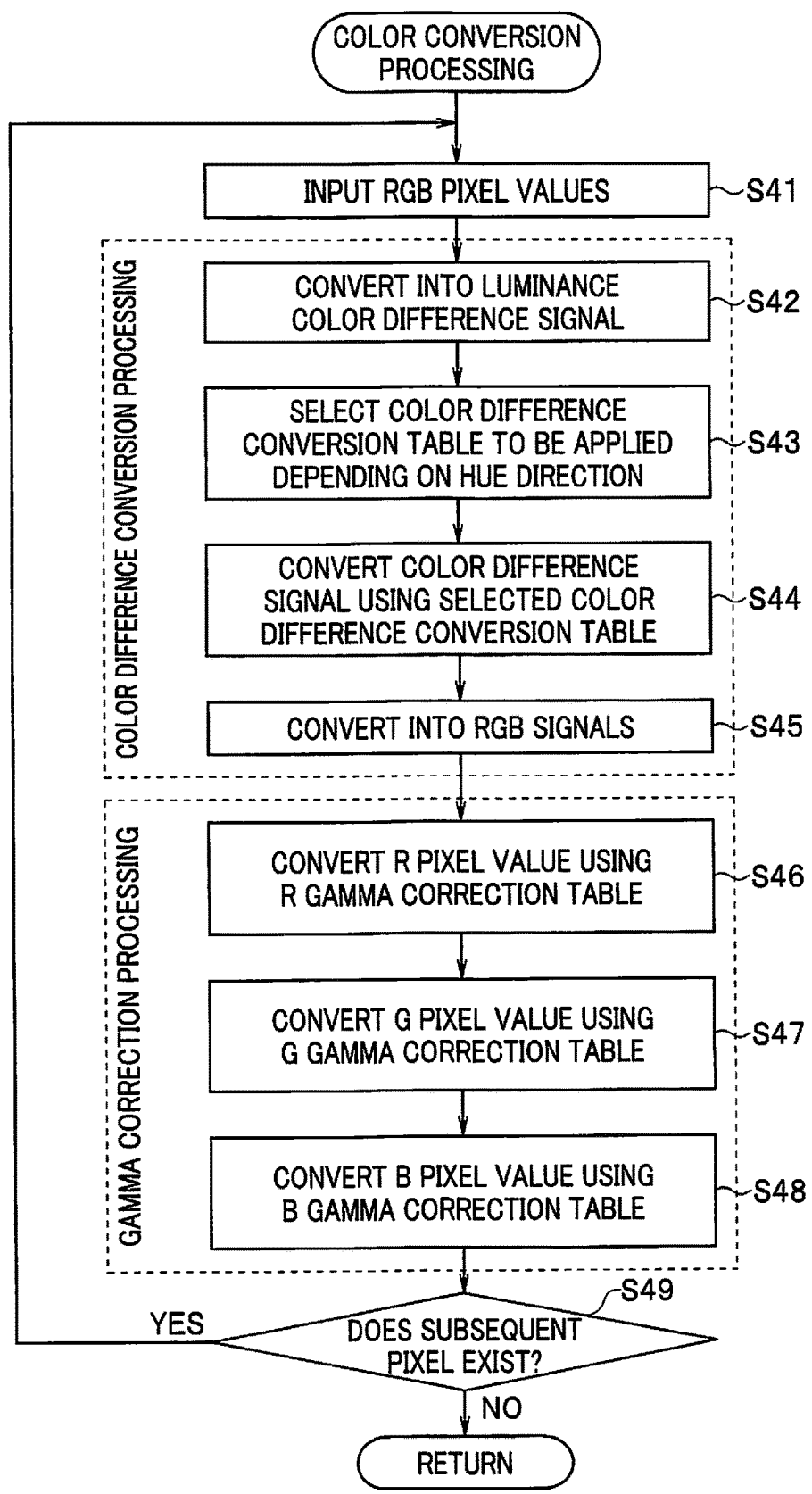
FIG. 17 is a flowchart illustrating details of color conversion processing in step S2 illustrated in FIG. 4 or 6 by a color conversion processing unit in the first embodiment.

FIG. 17 is a flowchart illustrating details of the color conversion processing in step S2 illustrated in FIG. 4 or 6 by the color conversion processing unit 35.

The color conversion processing is sequentially performed in units of pixels composing an image, to perform color conversion for the entire image. That is, when the processing is started, RGB pixel values of any one of the pixels composing the image are inputted (step S41).

Color difference conversion processing in steps S42 to S45 and gamma correction processing in steps S46 to S48 are performed, to perform the color conversion processing.

That is, a result corresponding to an output value (e.g., Cy_o) of a result of color conversion processing (see an io vector illustrated in FIG. 15) in which an input value (e.g., Cy_i) has been converted using a three-dimensional LUT is obtained through processing in two stages, i.e., color conversion processing (see an ic vector illustrated in FIG. 15) and gamma correction processing (see a co vector illustrated in FIG. 15), as illustrated in FIG. 15. More specifically, the input value Cy_i is subjected to color conversion processing to acquire Cy_c, and Cy_c is further subjected to gamma correction processing to obtain Cy_o.

More specifically, if processing in step S41 is performed, the RGB pixel values are then converted into a luminance color difference signal (step S42).

Then, a color difference (Cr, Cb) conversion table to be applied is selected depending on which of the R direction, the G direction, the Cy direction, and the Mg direction illustrated in FIG. 16, for example, is a hue direction of the pixel value (step S43).

When the color difference conversion table is selected, a color space may be previously divided into a plurality of regions respectively corresponding to a plurality of color difference conversion tables as options. As a result, the color difference conversion table is automatically selected depending on to which of the regions within the color space the pixel value belongs.

As an example, the color difference (Cr, Cb) conversion table in the R direction is selected when a color difference signal within the luminance color difference signal acquired in step S42 is in the same quadrant as the quadrant including R_i illustrated in FIG. 14, the color difference (Cr, Cb) conversion table in the G direction is selected when the color difference signal is in the same quadrant as the quadrant including G_i illustrated in FIG. 14, the color difference (Cr, Cb) conversion table in the Cy direction is selected when the color difference signal is in the same quadrant as the quadrant including Cy_i illustrated in FIG. 14, and the color difference (Cr, Cb) conversion table in the Mg direction is selected when the color difference signal is in the same quadrant as the quadrant including Mg_i illustrated in FIG. 14.

The color difference signal acquired in step S42 is converted using the selected color difference conversion table (step S44). Note that a luminance signal is not changed in the processing. Color difference conversion based on the Knee curve as illustrated in FIG. 16 can be performed as low-load and general-purpose image processing.

Then, the luminance signal and the color difference signal obtained by color difference conversion are each converted into RGB signals again (step S45). Processing in step S42 and processing in step S45, described above, are each general-purpose image processing performed in a general image processing apparatus.

Then, gamma correction processing is started, to convert an R pixel value in the RGB signals obtained by the conversion using the R gamma correction table (step S46).

Similarly, a G pixel value is converted using the G gamma correction table (step S47), and a B pixel value is converted using the B gamma correction table (step S48). Note that R gamma correction processing, G gamma correction processing, and B gamma correction processing may be performed in any order or concurrently.

The gamma correction processing in steps S46 to S48 is also low-load and general-purpose image processing performed in the general image processing apparatus.

It is determined whether a subsequent pixel exists within the image (step S49). If it is determined that the subsequent pixel exists, the processing returns to step S41. In step S41, the above-described processing is performed for the subsequent pixel. If it is determined that the subsequent pixel does not exist, the processing ends.

Note that, although the luminance color difference signal is converted into the RGB signals in step S45, and the gamma correction processing in steps S46 to S48 is then performed in the processing illustrated in FIG. 17, the present invention is not limited to this. For example, an input side and an output side of the table of the achromatic color lattice points illustrated in FIG. 10 are subjected to luminance color difference conversion, to create a correspondence table between an input luminance value and an output luminance value, and to further create a gradation conversion table relating to a luminance obtained by interpolating an intermediate value between the input luminance value and the output luminance value, like in FIG. 11. After processing in step S44 is performed, gradation conversion of the luminance is performed using the gradation conversion table relating to the luminance. Then, the processing in step S45 is performed, to convert the luminance color difference signal into the RGB signals. Such processing may be performed.

Thus, a result close to the result of the color conversion processing using the three-dimensional LUT and particularly a result obtained by reducing an error of a color signal in which a color conversion error is visually noticeable (an error from the result of the color conversion processing using the three-dimensional LUT) can be simply obtained by a low-load and general-purpose image processing circuit.

Note that the color difference signal processing information generation unit 22 subjects a representative output value (e.g., a representative lattice point Cy_o after color conversion) to degamma correction processing based on gamma correction processing information to acquire an intermediate representative value (e.g., a degamma lattice point Cy_c), and sets color difference signal processing information such that an intermediate representative value is acquired by subjecting a representative input value (e.g., a representative lattice point Cy_i) to color difference signal processing, to obtain a representative output value when the representative input value is subjected to color difference signal processing based on the color difference signal processing information and is then subjected to gamma correction processing based on the gamma correction processing information, as illustrated above in FIG. 15, for example.

Therefore, in the color conversion processing unit 35, the color difference signal processing unit 36 performs color difference signal processing for an image signal, and the gamma correction processing unit 37 then performs gamma correction processing.

However, the present invention is not limited to this. For example, the image processing apparatus 1 as an image color conversion apparatus may be configured such that color difference signal processing and gamma correction processing are performed in reverse order.

At this time, the color difference signal processing information generation unit 22 subjects a representative input value (the representative lattice point Cy_i illustrated in FIG. 15, etc.) to gamma correction processing (corresponding to the co vector illustrated in FIG. 15) based on gamma correction processing information to acquire an intermediate representative value (not illustrated in FIG. 15), sets color difference signal processing information such that a representative output value (e.g., the representative lattice point Cy_o after color conversion illustrated in FIG. 15) by subjecting the intermediate representative value to color difference signal processing (corresponding to the ic vector illustrated in FIG. 15), to obtain a representative output value when the representative input value is subjected to gamma correction processing based on gamma correction processing information and is then subjected to color difference signal processing based on the color difference signal processing information.

In this case, the color conversion processing unit 35 includes a gamma correction processing unit 37 configured to subject an image signal to gamma correction processing based on the gamma correction processing information and a color difference signal processing unit 36 configured to subject an image signal after the gamma correction processing to color difference signal processing based on the color difference signal processing information.

Although description has been made by taking a case where the three components constituting the color image signal are three RGB color components as an example, the present invention is not limited to this. For example, the color image signal may be a color image signal constituted by three components in complementary colors such as yellow, magenta, and cyan or may be a color image signal composed of three other components.

According to the first embodiment, instead of the color conversion using the three-dimensional LUT, gamma correction processing information and color difference signal processing information are generated based on a three-dimensional LUT, and gamma correction processing and color difference signal processing are performed to subject an image signal to color conversion. Accordingly, a result close to the color conversion using the three-dimensional LUT can be obtained without requiring a dedicated three-dimensional interpolation calculation circuit and while reducing a processing load. As a result, the color conversion processing can be simply performed using a low-load and general-purpose image processing circuit.

The gamma correction processing information is generated based on an achromatic color input value and an output value acquired by referencing the three-dimensional LUT based on the achromatic color input value. Accordingly, a result of highly accurate color conversion can be obtained for the achromatic color input value.

In addition, the three-dimensional LUT is referenced based on a representative input value as a chromatic color input value to acquire a representative output value, and the color difference signal processing information is set such that the representative output value is obtained when the representative input value is subjected to gamma correction processing based on gamma correction processing information and color difference signal processing based on color difference signal processing information. Accordingly, a value of a color which is visually noticeable or is emphasized is used as the representative input value so that the color which is visually noticeable or is emphasized can be subjected to color conversion with high accuracy and a result of the color conversion with little unnatural feeling can be obtained.

At this time, color difference signal processing information corresponding to a plurality of hues is set to subject the image signal to color difference signal processing based on color difference signal processing information corresponding to a hue of the image signal. Accordingly, more highly accurate color conversion can be performed for each of the hues.

In addition, the color difference signal processing information and the gamma correction processing information are generated to be appropriate when the color difference signal processing is first performed and the gamma correction processing is later performed. Accordingly, a conversion accuracy of a luminance axis passing through an achromatic color lattice point becomes high so that a gradation characteristic of a luminance having a high visual discrimination performance can be accurately reproduced.

On the other hand, when the color difference signal processing information and the gamma correction processing information are generated to be appropriate when the gamma correction processing is first performed and the color difference signal processing is later performed, a hue and a saturation of an image can be accurately reproduced.

When the three RGB color components are used as the three components, a range of a value (e.g., 0 to 255) taken by each of the color components can be easily grasped, and the luminance axis passing through the achromatic color lattice point can be easily extracted as a straight line satisfying R=G=B.

In addition, color difference signal processing information corresponding to each of respective color difference values of the two components is generated. Accordingly, two-dimensional color difference conversion can be performed as one-dimensional color difference conversion for each of the color difference values of the two components, and a processing load can be further reduced by eliminating the need for two-dimensional interpolation calculation or the like.

At this time, color difference signal processing information corresponding to a Knee curve passing through an origin, a Knee point, and a critical point is generated. Accordingly, interpolation calculation for any input value can be significantly easily performed.

Interpolation is performed based on a three-dimensional LUT constructed for discrete input values, to generate gamma correction processing information also giving an intermediate correspondence between an achromatic color input value and an output value. Accordingly, a processing load can be reduced and a processing speed can be increased by omitting interpolation processing performed when gamma correction processing is performed.

In addition, gamma correction processing information is generated for each of the colors R, G, and B. Accordingly, gamma correction processing can be performed only by referencing R, G, and B pixel values as they are.

When a chromatic color input value having a high luminance and a low saturation is set as a representative input value, a color having a high luminance and a low saturation in which a color conversion error is visually easily-noticeable can be converted without an unnatural feeling.

When at least one of a chromatic color input value corresponding to a skin color, a chromatic color input value corresponding to a green color of a plant, and a chromatic color input value corresponding to a blue color of a sky is set as a representative input value, a color which is easily emphasized as a memory color by a person can be converted into a natural color having no unnatural feeling.

Note that the processing of each of the above-described units may be performed by one or more processors configured as hardware. For example, each of the units may be a processor configured as an electronic circuit, or may be a circuit unit in a processor configured by an integration circuit such as an FPGA (field programmable gate array). Alternatively, a processor including one or more CPUs (central processing units) may execute a function as each of the units by reading and executing a computer program recorded on a recording medium.

Although an image color conversion apparatus has been mainly described above, the present invention may be an image color conversion method for performing similar processing to the processing performed by the image color conversion apparatus, a computer program for causing a computer to perform similar processing to the processing performed by the image color conversion apparatus, and a non-transitory computer readable recording medium storing the computer program, for example.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image color conversion apparatus, wherein plural three-dimensional look-up tables (LUTs) are configured to reference three components constituting a color image signal as input values to acquire output values of the three components after color conversion, the image color conversion apparatus comprising
at least one processor configured as hardware, the at least one processor being configured to
receive achromatic color input values,
reference a first three-dimensional LUT based on the achromatic color input values to obtain first output values,
generate gamma correction processing information using the first output values,
receive chromatic color input values,
reference a second three-dimensional LUT based on the chromatic color input values to obtain second output values,
set color difference signal processing information such that the second output values are obtained when the chromatic color input values are subjected to both (1) gamma correction processing based on the gamma correction processing information and (2) color difference signal processing based on the color difference signal processing information, and
subject the image signal to both (1) gamma correction processing based on the gamma correction processing information and (2) color difference signal processing based on the color difference signal processing information.

2. The image color conversion apparatus according to claim 1, wherein
the at least one processor
performs setting of the chromatic color input values as a plurality of chromatic color input values respectively having different hues, to set the color difference signal processing information corresponding to the plurality of hues, and
subjects the image signal to color difference signal processing based on the color difference signal processing information corresponding to a hue of the image signal.

3. The image color conversion apparatus according to claim 1, wherein
the at least one processor
subjects the second output values to degamma correction processing based on the gamma correction processing information to acquire an intermediate representative value, and sets the color difference signal processing information such that the intermediate representative value is acquired by subjecting the input values to the color difference signal processing, and
subjects the image signal to color difference signal processing based on the color difference signal processing information, and
subjects the image signal after the color difference signal processing to gamma correction processing based on the gamma correction processing information.

4. The image color conversion apparatus according to claim 1, wherein
the at least one processor
subjects the input values to gamma correction processing based on the gamma correction processing information to acquire an intermediate representative value, and sets the color difference signal processing information such that the second output values are acquired by subjecting the intermediate representative value to the color difference signal processing,
subjects the image signal to gamma correction processing based on the gamma correction processing information, and
subjects the image signal after the gamma correction processing to color difference signal processing based on the color difference signal processing information.

5. The image color conversion apparatus according to claim 3, wherein the at least one processor subjects the respective representative input values of the three components to luminance color difference conversion to acquire a representative input luminance value of one component and respective representative input color difference values of two components, subjects the intermediate representative values of the three components to luminance color difference conversion to acquire an intermediate representative luminance value of the one component and intermediate representative color difference values of the two components, and sets the color difference signal processing information where the representative input color difference value is converted into the intermediate representative color difference value for each of the color difference values of the two components.

6. The image color conversion apparatus according to claim 5, wherein the at least one processor generates, on a plane giving an output color difference value corresponding to an input color difference value, the color difference signal processing information corresponding to a Knee curve passing through an origin at which the input color difference value is zero and the output color difference value is zero, a Knee point at which the input color difference value is the representative input color difference value and the output color difference value is the intermediate representative color difference value, and a critical point including an upper-limit value of the input color difference value and an upper-limit value of the output color difference value for each of the color difference values of the two components.

7. The image color conversion apparatus according to claim 1, wherein
the first three-dimensional LUT is constructed for the discrete input values, and
the at least one processor interpolates the discrete achromatic color input values and the output values acquired by referencing the first three-dimensional LUT based on the discrete achromatic color input values, to generate the gamma correction processing information also giving an intermediate correspondence between the achromatic color input values and the first output values.

8. The image color conversion apparatus according to claim 1, wherein
the three components are three RGB color components, and
the at least one processor generates the gamma correction processing information including R gamma correction processing information giving an R output value after gamma correction processing for an R input value, G gamma correction processing information giving a G output value after gamma correction processing for a G input value, and B gamma correction processing information giving a B output value after gamma correction processing for a B input value based on the achromatic color input values where each value of the RGB color components is same and the output values of the RGB color components acquired by referencing the first three-dimensional LUT based on the achromatic color input values.

9. The image color conversion apparatus according to claim 2, wherein the at least one processor sets the chromatic color input values having a high luminance and a low saturation as the input values.

10. The image color conversion apparatus according to claim 2, wherein the at least one processor sets at least one of the chromatic color input values corresponding to a skin color, the chromatic color input values corresponding to a green color of a plant, and the chromatic color input values corresponding to a blue color of a sky as the representative input value.

11. A non-transitory computer-readable medium storing a computer program, wherein
plural three-dimensional look-up tables (LUTs) are configured to reference three components constituting a color image signal as input values to acquire a value of the three components after color conversion, and
the computer program is a program for causing a computer to
receive achromatic color input values, reference a first three-dimensional LUT based on the achromatic color input values to obtain first output values, generate gamma correction processing information using the first output values,
receive chromatic color input values,
reference a second three-dimensional LUT based on the chromatic input values to obtain second output values,
set color difference signal processing information such that the second output values are obtained when the chromatic color input values are subjected to both (1) gamma correction processing based on the gamma correction processing information and (2) color difference signal processing based on the color difference signal processing information, and
subject the image signal to both (1) gamma correction processing based on the gamma correction processing information and (2) color difference signal processing based on the color difference signal processing information.

12. An image color conversion method, wherein plural three-dimensional look-up tables (LUTs) are configured to reference three components constituting a color image signal as input values to acquire output values of the three components after color conversion, the image color conversion method comprising
receiving achromatic color input values,
referencing a first three-dimensional LUT based on the achromatic color input values to obtain first output values,
generating gamma correction processing information using the first output values,
receiving chromatic color input values,
referencing a second three-dimensional LUT based on the chromatic color input values to obtain second output values,
setting color difference signal processing information such that the second output values are obtained when the chromatic color input values are subjected to both (1) gamma correction processing based on the gamma correction processing information and (2) color difference signal processing based on the color difference signal processing information, and
subjecting the image signal to both (1) gamma correction processing based on the gamma correction processing information and (2) color difference signal processing based on the color difference signal processing information.

* * * * *